Nov. 10, 1925.

C. A. SNYDER 1,561,286

DUMPING TRUCK

Filed July 11, 1925

Inventor
Cecil A. Snyder
By E. Hatton Remington.
Attorney

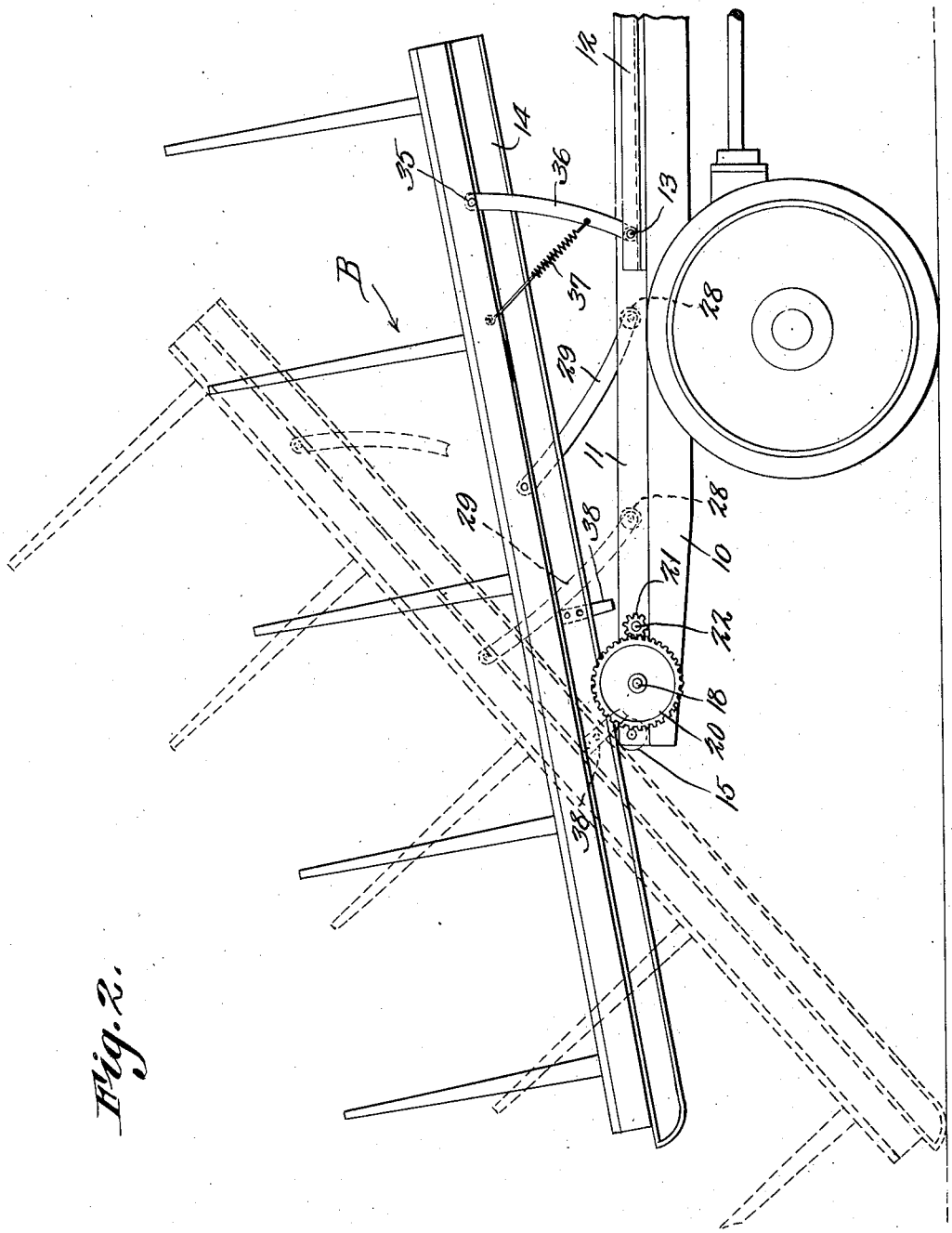

Nov. 10, 1925.
C. A. SNYDER
1,561,286
DUMPING TRUCK
Filed July 11, 1925     3 Sheets-Sheet 3
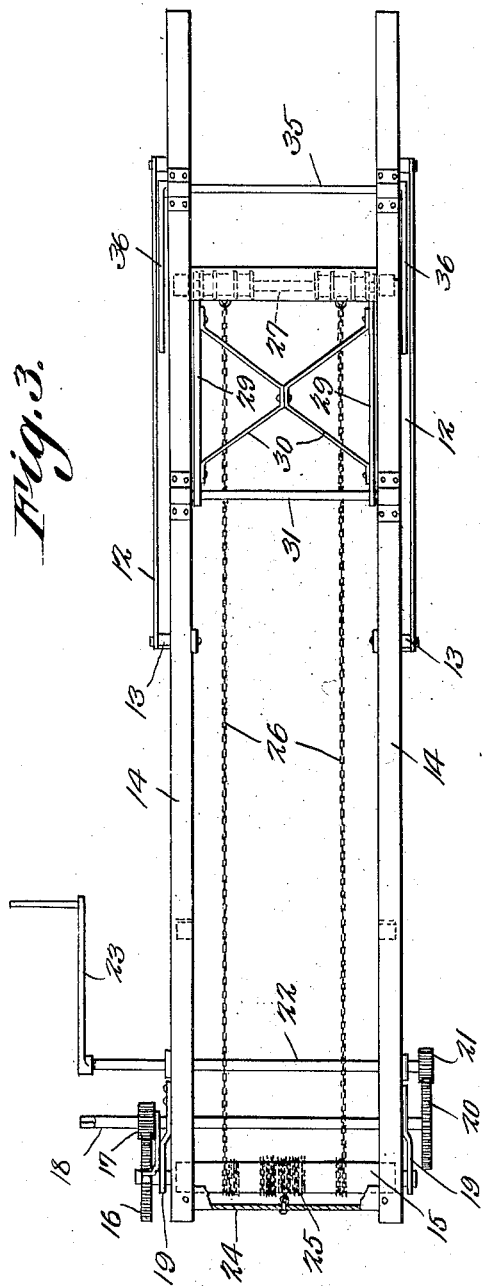
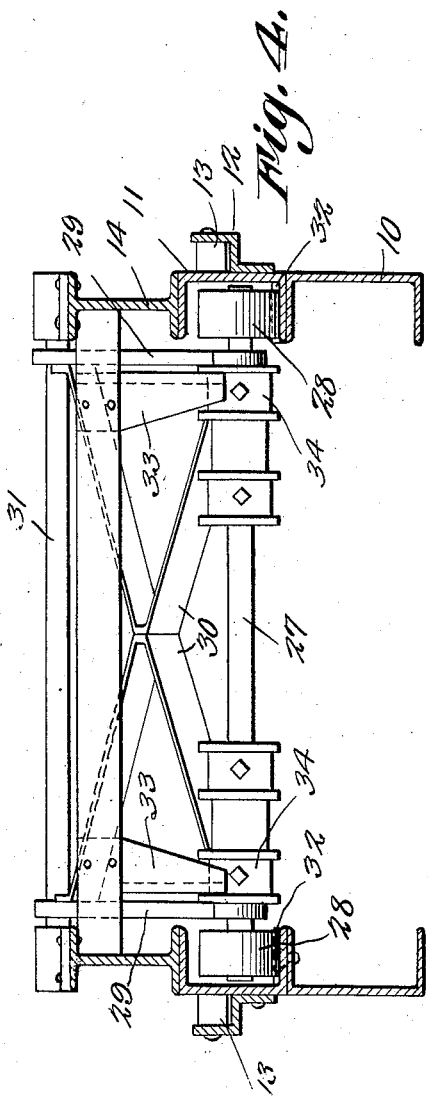
Inventor
Cecil A. Snyder,
By E. Chatton Brewington
Attorney Patented Nov. 10, 1925.

1,561,286

UNITED STATES PATENT OFFICE.

CECIL A. SNYDER, OF HAMPSTEAD, MARYLAND, ASSIGNOR OF ONE-HALF TO LEWIS C. CALTRIDER, OF REISTERSTOWN, MARYLAND.

DUMPING TRUCK.

Application filed July 11, 1925. Serial No. 42,863.

*To all whom it may concern:*

Be it known that I, CECIL A. SNYDER, a citizen of the United States, residing at Hampstead, in the county of Carroll and State of Maryland, have invented certain new and useful Improvements in Dumping Trucks, of which the following is a specification.

This invention relates to lumber trucks and has special reference to a dump truck for lumber.

Trucks of this character have been devised wherein the dump body is shiftably supported on the frame and moved backwardly by suitable means until the center of gravity of the load passes beyond the rear end of the frame whereupon the body tilts and the load is discharged. Such trucks are objectionable because of lack of control of the dumping so that the rear end of the body frequently strikes the ground with such force that breakages ensue.

Other trucks have been designed with lifting levers attached to the dump body close to the vertical line from the center of gravity of the load downwardly, the center of gravity being tilted rearwardly of the rear end of the frame upon the load being drawn rearwardly and stopped by a suitable check with the center of gravity forward of such check. Such trucks are objectionable because of the aforesaid difficulty of control and are further objectionable because of the excessive force needed, under such conditions, to raise the front end of the load.

With these objections in mind one object of the present invention is to provide an improved general construction of truck of this description wherein no sudden destruction drop of the rear end of the body will take place under load conditions.

A second important object of the invention is to provide an improved truck construction wherein the front end of the body will be initially raised to a somewhat inclined position by means requiring but little force, the body being drawn backward in this position so that its rear end is close to the ground and the final tilting for effecting dumping being accomplished with but little power expenditure.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a similar view showing the initial tilting of the body in full lines and its dumping position in dotted lines.

Figure 3 is a plan view thereof on a reduced scale.

Figure 4 is an enlarged section on the line 4—4 of Figure 1.

Figure 1:
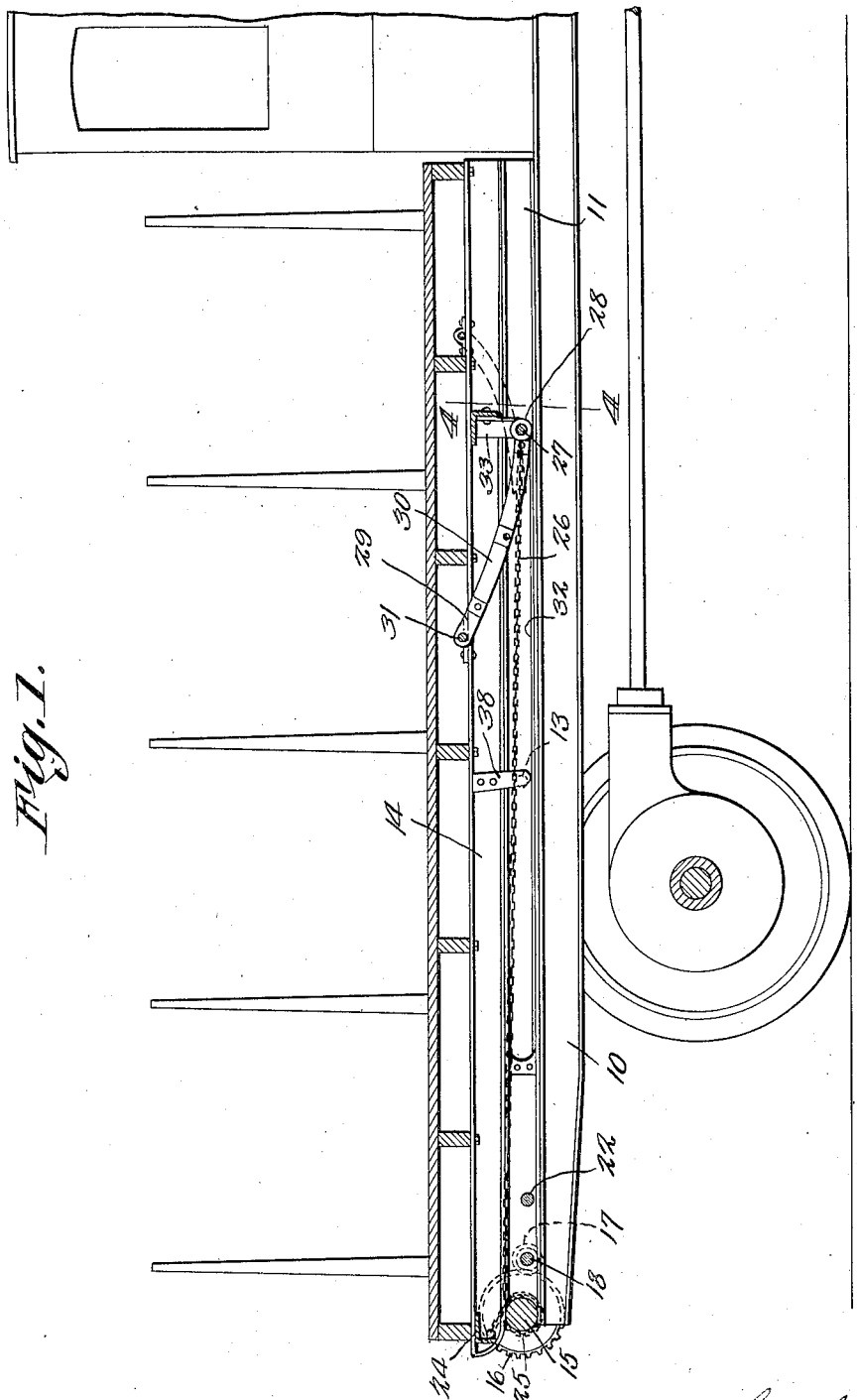
Figure 1 is a section of the rear part of an automobile truck as constructed in accordance with the present invention.

In the present embodiment of the invention there is shown a truck chassis having longitudinal side frame member 10 of channel form. On top of these members rests similar auxiliary frame members 11 and to the outer sides of these members 11 are secured Z-bars 12 which are arranged to form channels open at the top and closed at their rear ends by stops 13. On top of the channels 11 rest the longitudinal frame members 14 of the truck body B.

Journalled in the rear ends of the members 11 is a drum or roller 15 whereon the rear ends of the members 14 rest and one end of this drum has its journal provided with a gear 16 wherewith meshes a pinion 17 fixed on a shaft 18 which extends transversely of the chassis and is journalled in said members 11. Bearings 19 are carried by the members 11 for journaling the drum in such position that it may support the members 14. The remaining end of the shaft 18 has secured thereon a gear 20 wherewith meshes a pinion 21 carried on a shaft 22 extending across the rear portion of the chassis. A crank 23 is adapted to fit either the shaft 18 or the shaft 22, being used on the shaft 18 for light loads or an unloaded body and on the shaft 22 for heavy loads. Also this crank can be shifted to bring its handle under the body of the truck to lock the drum against rotation.

The members 14 are connected at their rear ends by a cross frame member or bar 24 to which is connected one end of a chain 25 the other end of which is wound on the drum 15 under normal or traveling conditions. Two other chains 26 are also wound on this drum and extend forwardly to an axle or shaft 27 to which they are attached. This shaft 27 is provided with rollers or wheels 28 which travel in the channels 11 and extending rearwardly and upwardly from this shaft are arms 29 which are connected by braces 30 and have their forward ends connected to a cross bar 31 carried by the members 14. Thus, when the drum is revolved in proper direction the chains 26 are pulled and the body B, drawn to the rear. In order to lighten the draft by raising the front end of the body the channels 11 are each provided on its lower flange with a track 32 consisting of a thin flat strip which terminates just to the rear of the normal position of the rollers and struts 33 normally engage discs 34 on said shaft to raise the body, these struts being connected at their upper ends to said body.

Adjacent the forward ends of the members 14 there is provided a transverse shaft or bar 35 whereon are pivoted bars 36 which travel in the channels formed by the Z-bars. Springs 37 serve to prevent these bars or levers 36 from exceeding certain limits of movement and stops 38 are fixed to the members 14 to limit rearward movement of the body.

In operation let it be supposed that the body is in the position shown in Figure 1. Then if the drum be revolved to draw the body to the rear the wheels or rollers 28 will run up on the tracks and lift the front ends of the members 14 clear of the members 11. Next the forward ends of the levers 36 will engage the stops 13 and incline the body as shown in full lines in Figure 2. This of course will effect inclination of the bars or levers 29 as also shown in said figure so that it now becomes an easy matter, owing to this inclination to further tilt the body to the position shown in dotted lines in Figure 2. Meanwhile the chain 25 has unwound. Upon reaching the dotted line position the load will dump whereupon reversal of movement of the drum will restore the body to normal position.

Having thus described the invention, what is claimed as new, is:

1. In a dump truck, a chassis, a body supported on said chassis and movable longitudinally thereof, means to move said body rearwardly of the chassis, a pair of arms actuated by said rearward movement for effecting partial checking of said rearward movement and assisting primary tilting of the body and a second pair of arms controlled by the action of the body moving means to effect further tilting of said body.

2. In a dump truck, a chassis, a body supported on said chassis and movable longitudinally thereof, means to move said body rearwardly of the chassis, a pair of arms actuated by said rearward movement for effecting partial checking of said rearward movement and assisting primary tilting of the body, said arms being carried by the body, stop means on the chassis engageable by said arms to bring said arms into operation and a second pair of arms controlled by the action of the body moving means to effect further tilting of said body.

3. In a dump truck, a chassis, a body supported on said chassis and movable longitudinally thereof, means to move said body rearwardly on said chassis, a pair of arms pivotally supported on opposite sides of said body and extending downwardly and rearwardly from their pivotal axis, guides carried by the chassis wherein the free ends of said arms move, stops in said guides engaging said free ends upon rearward movement of said body to effect tilting of said body to an extent determined by the length of said arms, said moving means including elements arranged to effect further tilting of the body upon the body reaching the limit of its rearward movement, and stop means for limiting said rearward movement.

4. In a dump truck, a chassis, a body supported on said chassis and movable longitudinally thereof, means to move said body rearwardly on said chassis, a pair of arms pivotally supported on opposite sides of said body and extending downwardly and rearwardly from their pivotal axis, guides carried by the chassis wherein the free ends of said arms move, and stops in said guides engaging said free ends upon rearward movement of said body to effect tilting of said body to an extent determined by the length of said arms, said moving means including a pair of arms pivotally mounted on said body and extending forwardly and downwardly from their pivotal axis, a drum on the rear of the chassis on which the rear of the body rolls, a cable wound on said drum and connected to the last mentioned arms, and guides on said chassis by which the free ends of the last mentioned arms are guided; and stop means for limiting the rearward movement of the body.

5. In a dump truck, a chassis, a body supported on said chassis and movable longitudinally thereof, means to move said body rearwardly on said chassis, a pair of arms pivotally supported on opposite sides of said body and extending downwardly and rearwardly from their pivotal axis, guides carried by the chassis wherein the free ends of said arms move, and stops in said guides engaging said free ends upon rearward movement of said body to effect tilting of said body to an extent determined by the length of said arms, said moving means including a pair of arms pivotally mounted on said body and extending forwardly and downwardly from their pivotal axis, a drum on the rear of the chassis on which the rear of the body rolls, a shaft connecting the free ends of said second mentioned arms, rollers on said shaft at the ends thereof, guides on the chassis receiving said rollers, a drum at the rear of said chassis on which the rear under part of the body rests, and a cable wound on said drum and connected to said shaft; and stop means for limiting rearward movement of the body.

6. In a dump truck, a chassis, a body supported on said chassis and movable longitudinally thereof, means to move said body rearwardly on said chassis, a pair of arms pivotally supported on opposite sides of said body and extending downwardly and rearwardly from their pivotal axis, guides carried by the chassis wherein the free ends of said arms move, and stops in said guides engaging said free ends upon rearward movement of said body to effect tilting of said body to an extent determined by the length of said arms, said moving means including a pair of arms pivotally mounted on said body and extending forwardly and downwardly from their pivotal axis, a drum on the rear of the chassis on which the rear of the body rolls, a shaft connecting the free ends of said second mentioned arms, rollers on said shaft at the ends thereof, guides on the chassis receiving said rollers, said guides having elevated positions for slightly lifting the forward part of the body to free it from contact with the chassis, a drum at the rear of said chassis on which the rear under part of the body rests, and a cable wound on said drum and connected to said shaft; and stop means for limiting rearward movement of the body.

In testimony whereof I affix my signature.

CECIL A. SNYDER.